United States Patent [19]

Assbeck et al.

[11] Patent Number: 4,510,434

[45] Date of Patent: Apr. 9, 1985

[54] METHOD AND APPARATUS FOR THE AUTOMATIC SETTING OF THE OPTIMUM OPERATING POINT OF A D-C VOLTAGE SOURCE

[75] Inventors: Franz Assbeck, Erlangen; Volker Fleckenstein, Nuremberg, both of Fed. Rep. of Germany

[73] Assignee: Siemens Aktiengesellschaft, Berlin and Munich, Fed. Rep. of Germany

[21] Appl. No.: 478,343

[22] Filed: Mar. 24, 1983

[30] Foreign Application Priority Data

Mar. 31, 1982 [DE] Fed. Rep. of Germany ....... 3212022

[51] Int. Cl.[3] ............................................... H02J 3/12

[52] U.S. Cl. .................................... 323/237; 323/282; 323/906; 363/124

[58] Field of Search ............... 323/237, 265, 282, 906; 363/124

[56] References Cited

FOREIGN PATENT DOCUMENTS 0029743 6/1981 European Pat. Off. ............ 323/906

*Primary Examiner*—Peter S. Wong

*Assistant Examiner*—Anita M. Ault

*Attorney, Agent, or Firm*—Kenyon & Kenyon

[57] ABSTRACT

Solar generators, fuel cells and similar d-c voltage sources have a current-voltage characteristic, on which at one point ("maximum power point" MPP) the maximum power can be taken from the d-c voltage source. In an arrangement, in which a d-c voltage source feeds a consumer through a controllable power converter, the optimum operating point is automatically set by setting a reference value for the voltage or the current into the converter, and impressing a supplemental reference value temporarily thereon as a disturbance variable at certain time intervals. If due to the impression, the output power of the d-c voltage source increases, the reference value is adjusted in the direction of the supplemental reference value. If, on the other hand, the sign of the power change is negative, the reference value is changed opposite to the sign of the supplemental reference value. After a finite number of reference value changes, the instantaneous operating point is this brought to the optimum operating point. Since the sign of the power change is determined through evaluation of the derivative with respect to time of the actual power value, the amplitude of the disturbance variable can be chosen very small, so that the operation of the consumer is not impaired.

10 Claims, 4 Drawing Figures

METHOD AND APPARATUS FOR THE AUTOMATIC SETTING OF THE OPTIMUM OPERATING POINT OF A D-C VOLTAGE SOURCE

BACKGROUND OF THE INVENTION

This invention relates to a method for the automatic setting of the optimum operating point of a d-c voltage source having an internal resistance, as well as apparatus for automatically setting, such a point.

Such a d-c voltage source may be, for instance, a storage battery, a thermocouple, a fuel cell or, in particular, a solar generator. Apart from the fact that the power delivered by these d-c voltage sources depends on non-electric parameters such as the ambient temperature, the internal temperature, the state of charge in the case of storage batteries or the incident power in the case of solar generators, it is a common feature of these d-c voltage sources that there is a definite physical relationship between their two electrical state variables (output voltage and output current) which is usually described by an internal resistance in an equivalent circuit diagram. If, therefore, electric power is taken from these d-c power sources by a d-c control element (chopper), a voltage transformer or another matching transformer, and is fed to a load connected thereto, the more current which is taken off via the voltage transformer, the more the theoretically obtainable miximum output voltage drops. If on the other hand, the voltage transformer is controlled or regulated in such a manner that a given output voltage of the d-c voltage source is maintained, the current which can be taken off is determined thereby. The voltage source has only one electrical degree of freedom, which can be preset as the operating point of the voltage source or the matching transformer. The power output of such a voltage source is a function of the corresponding degree of freedom, i.e., of the operating point, which has its maximum generally at a certain value which represents the optimum operating point ("Maximum Power Point", MPP) with respect to the utilization of the voltage source. Especially in voltage sources, the primary energy of which is free (for instance, solar energy) or practically free as compared to the cost of installation, it is desirable, for optimum utilization of the system, to have the system always run practically at full load, i.e., to always operate at the MPP, in order to supply as much electric energy as possible from the d-c voltage source into a load, for instance, an energy accumulator, such as a battery.

Among the loads which must be considered, in connection with a d-c chopper or another d-c voltage transformer, are consumers such as the on-board network of a vehicle. A d-c voltage transformer can also be used in cases such as a charging controller for a storage battery, with the storage battery followed by a controlled inverter which supplies, for instance, the bus bar of an "insular network", i.e., of a remote group of consumers which is not supplied from the public supply network. If instead of a d-c voltage transformer a controlled inverter (generally, a controlled power converter) is used to convert the primary energy taken from the d-c voltage source into another form of electric energy in a controlled manner, then a-c consumers such as feed pumps which are used for further energy conversion, for instance, the conveying of heat energy of a medium, must also be considered as consumers.

It is already known from DE-OS 29 03 559 to control the power consumption of a load by means of a d-c transformer connected to a solar generator, where the d-c voltage transformer is fed a control voltage by means of which the output voltage of the solar generator is to be controlled to the voltage value corresponding to the optimum voltage value. Accordingly, the control voltage is formed by the control deviation of the generator output voltage from a reference voltage, where the reference voltage is furnished by a solar cell of similar construction, but which is open-circuited, in order to take influences of non-electrical environmental variables into consideration. In other words, for an electrical state variable of the d-c voltage source determining the operating point of a solar generator, a reference value is pre-set, by means of which the power input of a controllable power transmitter connected to the d-c voltage source is controlled or regulated. However, the influence of a change in the operating point due to the current flowing from the d-c voltage source (also designated as a "panel") with its declining characteristic cannot be taken into account sufficiently by the artificial reference voltage formed by the unloaded measuring cell. In addition, spread from unit to unit due to manufacturing tolerances leads to incorrect adjustments of the operating point.

In the known device, the optimum operating point can no longer be found at all if the solar generator or the unloaded measuring cell supplying the reference voltage is partially in the shade or is dirty.

SUMMARY OF THE INVENTION

The present invention provides a simple method and simple apparatus for automatically setting the operating point to the optimum operating point or for readjusting it if changes of the state parameters of the panel occur. This is accomplished by doing the following:

(a) setting a reference value for an electrical state variable which determines the operating point of the d-c voltage source, by means of which the power consumption of a controllable energy converter connected to the d-c voltage source is controlled or regulated, (b) temporarily impressing on the reference value a supplemental reference value at given time intervals, (c) determining the differential change of the power output of the d-c voltage source caused by this impression, and (d) after the impression of the supplemental refeence value has ended, changing the reference value, with the sign of the reference value change, for a determined positive diffeential change of the delivered power, the same as the sign of the supplemental reference value, and opposite to the sign of the supplemental reference value, if the differential power is found to be negative.

The starting point is accordingly a d-c voltage source, especially a solar generator, which is followed by a controlled power transmitter for supplying a consumer. The transmitter is controller or regulated so that the electric power delivered by the panel is a maximum. To this end, an appropriate reference value is set in for a state variable determining the operating point of the panel, i.e., the panel voltage or the panel current. To this reference value is temporarily added, at certain time intervals, an additional value, acting as a disturbance quantity, and the differential change of the panel power caused thereby is determined. After the addition of the supplemental value is terminated (by removal of the disturbance quantity), the reference value is corrected, i.e., changed permanently, the sign of this reference value change being chosen equal to the sign of the supplemental value if a positive differential change of the panel power was determined during the time of the addition, i.e., the derivative of the measured power value with respect to time caused by the addition, is positive. If, however, the addition of the additional reference value led to a negative differential change of the delivered panel power, the direction of the correction (the sign of the reference value change) is opposite to the sign of the additional reference value. Thus, a correction of the reference value is made which always leads to an operating point with higher panel power, until the MPP is exceeded. From then on, further corrections cause the operating point to oscillate about the MPP. The smaller the correction steps and the amplitude of the disturbance variable (supplemental reference value) are chosen the smaller the variations caused by these oscillations can be kept. According to the present invention, it is not the change ΔP of the panel power output P itself that is evaluated, but its derivative with respect to time dΔP/dt, so that even small disturbance amplitudes are sufficient to make an exact qualitative statement regarding the increase or decrease of the panel power.

The disturbance variable amplitudes can be chosen so small that they cause only a change of less than 1% and, less than preferably, 0.1% in the power output of the panel, i.e., they have practically no effect on the panel control itself.

If one compares, on the other hand, the actual power values themselves before and after the disturbance quantity is added, the differences of these actual power values could no longer be determined with the desired reliability, considering the accuracies of the usual measuring and evaluating devices. In one particularly simple apparatus, the magnitude and the sign of the supplemental reference value, i.e., the disturbance variable, are pre-set as fixed and equal for all additions. The amount of the reference value change itself can be determined from the respective change of the panel power output due to the addition of the supplemental reference value, whereby for large deviations between the maximum power point and the operating point, the reference value change is initially made large so as to approach the MPP quickly. However, the method can be carried out even more simply if the magnitude of the reference value changes is pre-set as equal and fixed for all reference value changes; in particular, the value of the reference value changes can be chosen smaller than the magnitude of the supplemental reference value.

The change of the delivered panel power output is preferably determined by differential evaluation of the steady states of the panel output before and after the supplemental reference value is added. For this purpose, the actual power value (for instance, slightly smoothed) which is determined in the steady state before a disturbance variable is added, can be fed, immediately before the disturbance variable is added, to a memory which appllies this interimly stored actual value to the input of a differentiating stage until, with the disturbance variable added, a steady state actual power value again adjusts itself which is then applied to the input of the differentiating stage instead of the interimly, stored actual power value. Thereby, a step function change ΔP is produced at the input of the differentiating stage, which generates a large output signal dΔP/dt even for a very small ΔP.

Since, for instance, at low illumination intensity of a solar generator, a reference value change leads to only correspondingly smaller, hard to evaluate changes of the panel power output, a fixed reference value can be set in as soom as the power output falls below a set minimum value.

DETAILED DESCRIPTION

Figure 1:
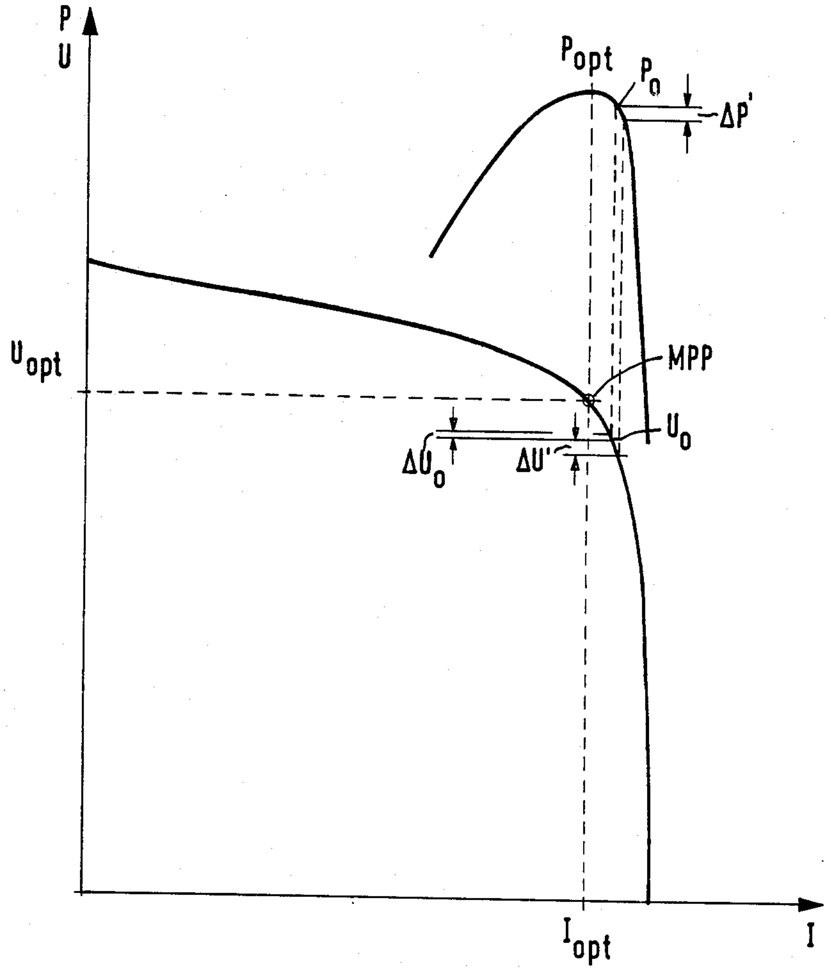
FIG. 1 shows the shape of the current-voltage characteristic of a solar generator as well as the dependence of the panel output on the degree of freedom of the arrangement.

In FIG. 1, the relationship between the output voltage U (panel voltage) of a solar generator and the current I taken off (panel current) is plotted. Also shown is the solar power P, i.e., the product of panel voltage and panel current. The solar power P has a pronounced maximum $P_{opt}$, to which the values $U_{opt}$ and $I_{opt}$ of the two electrical state variables U and I correspond in the U/I state diagram. The diagrams shown, which differ somewhat from panel to panel even for different panels of the same type, were measured with an incident radiation of 930 W/m$^2$, and ambient temperature of 24° C. and a panel temperature of 36° C. If these external, non-electrical parameters are changed, other diagrams are obtained. With the present invention, the optimum operating point which is given by $U_{opt}$ and $I_{opt}$, is adjusted automatically.

Figure 2:
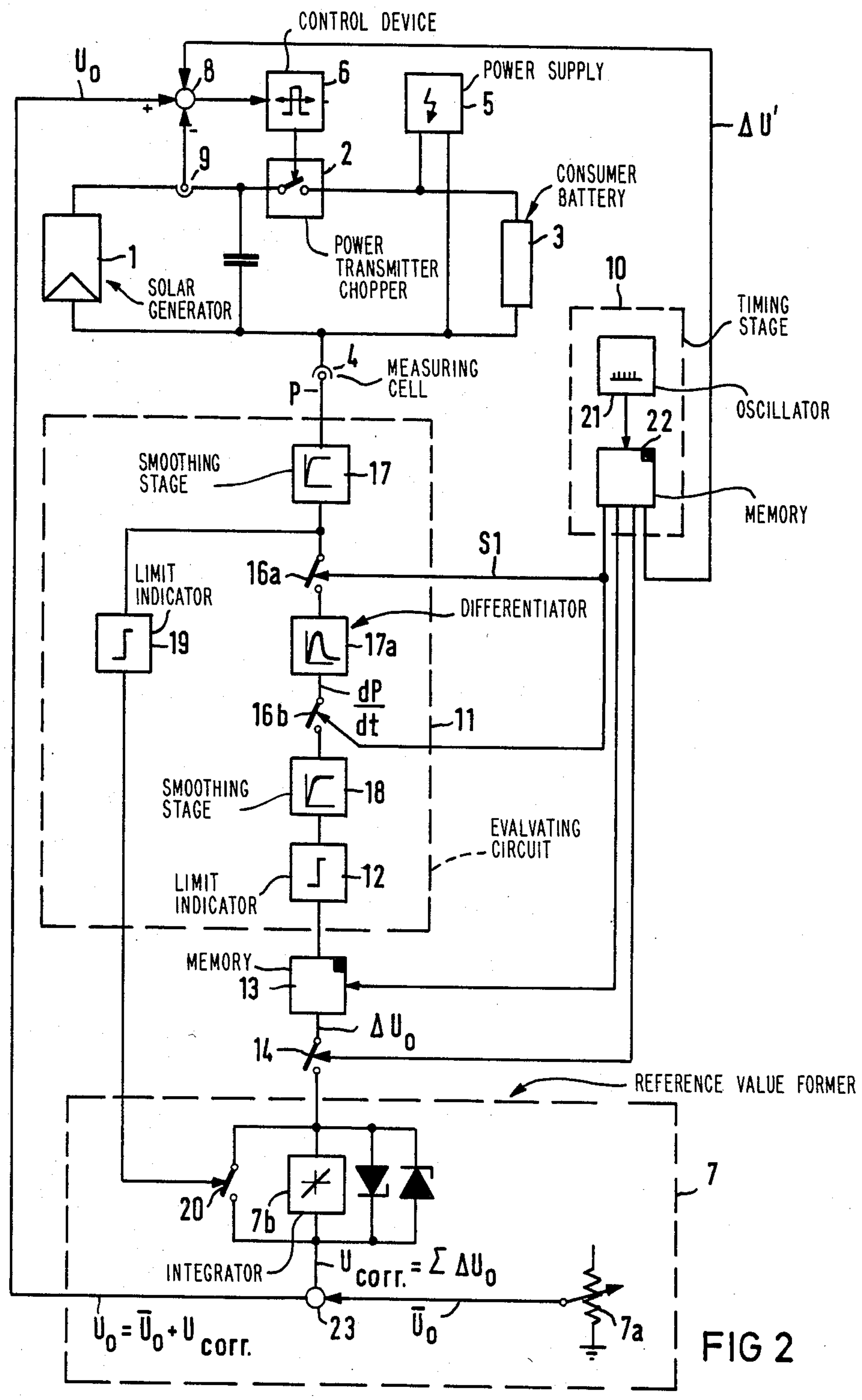
FIG. 2 illustrates apparatus for implementing the method of the present invention.

In the following, the case where, according to FIG. 2, a solar generator 1 feeds a consumer 3 via an electric power transmitter 2 is considered. In the present case, the power transmitter 2 is designed as a d-c chopper and serves as a charge controller for a battery 3. The terminal voltage of the battery changes only very little when a disturbance variable is added, so that the electric power which is fed to the battery and is taken from the solar generator via the d-c chopper, is practically proportional to the charging current of the battery, which can be measured at the measuring cell 4. The input voltage of the battery also provides, via a power supply 5, the supply voltage for the control device 6 of the d-c chopper as well as for further control devices.

It is the objective of the control according to the present invention to regulate the state variable U (in this case, therefore, the panel voltage), as the command variable of the arrangement, to the optimum operating point $U_{opt}$, which is done by changing the duty cycle of the switch contained in the d-c chopper 2. Thereby, the current flowing through the chopper 2 is varied with the command variable of the system, so as to correspond to the desired operating point.

Advantageously, a reference value former 7 supplies a base reference value $\overline{U}_o$ and a correction reference value $U_{corr}$, which are added up to the reference value $U_o=\overline{U}_o+U$ corr. First assume that the apparatus is operating at an operating point different from the selected base optimum operating point (maximum power point MPP), which is given by the voltage $U_o$ and is fixed at a setting device 7*a* in the reference value former. The arrangement can be operator controlled, but a regulator may also be provided. The control deviation between the reference value $U_o$ and an actual value for the panel voltage, taken off by means of a corresponding measuring stage 9, is formed in a comparator 8, to obtain the control variable of the control device 6 of the chopper 2.

A timing stage 10 now generates a disturbance variable (supplemental value $\Delta U'$), which is impressed temporarily on the reference value $U_o$ set at the reference value former 7, as a disturbance voltage pulse at the comparator 8. If the sign of the supplemental reference value $\Delta U'$ is negative, it leads, in the case $U_o < U_{opt}$ shown in FIG. 1, to a decrease of the panel power P delivered by the solar generator. The sign of this power change $\Delta P'$, which is given by the difference of the panel power $P_o$ and the panel power caused by the impression of the disturbance variable $\Delta U'$, therefore indicates in which direction $U_o$ must be changed in order to approach $U_{opt}$. An evaluating circuit 11 which evaluates the derivative with respect to time of the panel power delivered before and after the disturbance variable is impressed, therefore determines the change in the power delivered by the solar generator caused by the impression.

In dependence on the sign of the load change ascertained by the evaluating circuit 11, the reference value $U_o$ furnished by the reference value former 7 is then changed. For this purpose, the reference value former 7 has an integrator 7*b*, which is shunted by two antiparallel Zener diodes for limiting the voltage. For readjusting the reference value, the evaluating circuit 11 has in its output a limit indicator 12 which furnishes the sign of the power change in the form of a digital signal and feeds it into a memory 13, for instance, a flip-flop circuit. The memory output is wired so that a positive or negative voltage $\Delta U_o$ (depending on an increase or decrease of the power) of constant magnitude is made available, depending on the stored signal. After the end of the impression of the supplemental reference value $\Delta U'$, the timing stage 10 closes a switch 14 between the memory 13 and the integrator 7*b*, so that the voltage then made available by the memory is added for a short time to the integrator 7*b* as an input voltage with a sign corresponding to the sign of the differentiated power change. The integrator sums up these short voltage pulses $\Delta U_o$, so that the integrator output voltage $U_{corr} = \Sigma \Delta U_o$ is adjusted accordingly as a correction variable to the base reference value $\Delta U_o$.

The reference value $U_o$ is therefore changed after every impression by a constant fixed correction amount $\Delta U_o$. After a finite number of such correction steps, each of which consist of a temporary impression of the supplemental reference value $\Delta U'$ and a subsequent permanent reference value change by $\Delta U_o$, the maximum power point is thereby reached, and in all further impressions, the operating point will oscillate only slightly about this optimum operating point.

The sign and the magnitude of the supplemental reference value $\Delta U'$ are fixed in the present case by the timing stage 10. Because of the very sensitive differential detection of the power change, $\Delta U'$ can be chosen so that the change of the output voltage U caused by the impression of the disturbance variable is 0.1% to at most 1% of the voltage $U_{opt}$ at the MPP. The refeence value $\Delta U_o$ is determined by the closing time of the switch 14 and is advantageously chosen so that $\Delta U_o$ is somewhat smaller than $\Delta U'$.

The timing stage 10 further controls a switching device comprising of two switches 16*a* and 16*b* within the evaluating circuit 11. In the present case, one current measuring element for determining the power output of the d-c voltage source is sufficient for the evaluating circuit 11 since the terminal voltage of the consumer, i.e., the battery input voltage, remains practically constant when the disturbance variable is switched on and off, and a slow change of the terminal voltage depending on the charging state of the battery is of no significance for the differential power change. In other cases, current and voltage must both be measured for determining the power or its differential change and must be multiplied by each other.

The switch 16*a*, which is opened immediately before or at least with the start of the impression of the supplemental reference value, connects the measuring stage 4 (or an actual value smoothing stage 17 with a small time constant connected thereto) to a memory and differentiator, 17*a*, in which the value of the output power which is measured before the impression and corresponds to a steady state of the panel, is then stored. Still before the end of the impression, as soon as the arrangement has settled at a new stationary value corresponding to $U_o + \Delta U'$, the switch 16*a* is closed again to place in the memory the new steady state measurement value. The memory is followed by a differentiating stage: the memory and the differentiating stage are combined to form a common differentiating device 17*a*, as shown in FIG. 3.

The memory and the switch interact so that, at the input of the differentiating stage, the respective measured power value is fed in before the switch is opened; the value which was measured and stored immediately before the disturbance variable was impressed, is fed in while the switch is open; and the measured value then belonging to $U_o + \Delta U'$ is again fed in after the switch is closed. Since these measured values are always obtained in a steady state condition, the differentiating stage therefore picks up only the change of the steady state power $P_{stat}$ due to the disturbance variable or its change $\Delta P_{stat}$, which is applied as a voltage pulse after the switch 16*a* is closed again, and is differentiated. At the output of the differentiating stage 17*a* the differential change of the stationary power output of the d-c voltage is therefore present.

Figure 3:
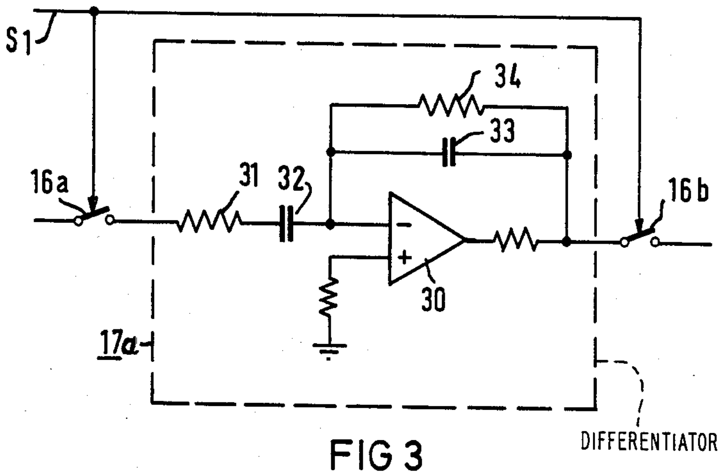
FIG. 3 is a circuit diagram of the most important part of an evaluating circuit for determining the steady state power change.

According to FIG. 3, a capacitor 32 fed through a resistor 31 preceding an operational amplifier 30 acts as a memory which is charged when the highly insulating switch 16*a* is closed, in accordance with the applied input signal, and retains this charge practically unchanged until the switch 16*a* is closed again. The operational amplifier 30 is configured by means of the capacitor 32 and the resistance 31 as a differentiator and by means of the R-C circuitry 33 and 34 as an additional smoothing filter. The switch 16*b*, which is controlled and operated by a control signal S1 together with the switch 16*a*, prevents, during the "off" time of switch 16*a*, currents from flowing from the differentiating device 17*a* into a smoothing stage 18 connected thereto. This smoothing stage may consist, for instance, of a passive lowpass and an active smoothing stage and is used to smooth a superimposed a-c component of the differentiator output voltage which stems from harmonics of the actual power value.

The above-mentioned limit indicator 12 determines the sign of this (smoothed) power change and leads, via the above-described impression by means of the elements 13 and 14 to a readjustment of the correction reference value $U_{corr}$ or the reference value $U_o$, respectively, by the voltage $\Delta U_o$.

In addition, a further limit indicator 19 is provided which checks if the actual value of the output power falls below a minimum value, and closes a shorting switch 20 at the integrator 7b and thereby disengages the means for readjusting the reference value $U_o$ as soon as the output power of the solar generator is so low that a proper determination in the evaluating circuit 11 is no longer possible.

The interaction between the impression of the supplemental reference value $\Delta U'$ and the readjustment of the reference value takes place in operating cycles which are set by the timing circuit 10. The duration of such a cycle may be, for instance, 2 seconds and can be divided by a suitable oscillator 21 followed by a counter, into 256 time steps.

Figure 4:
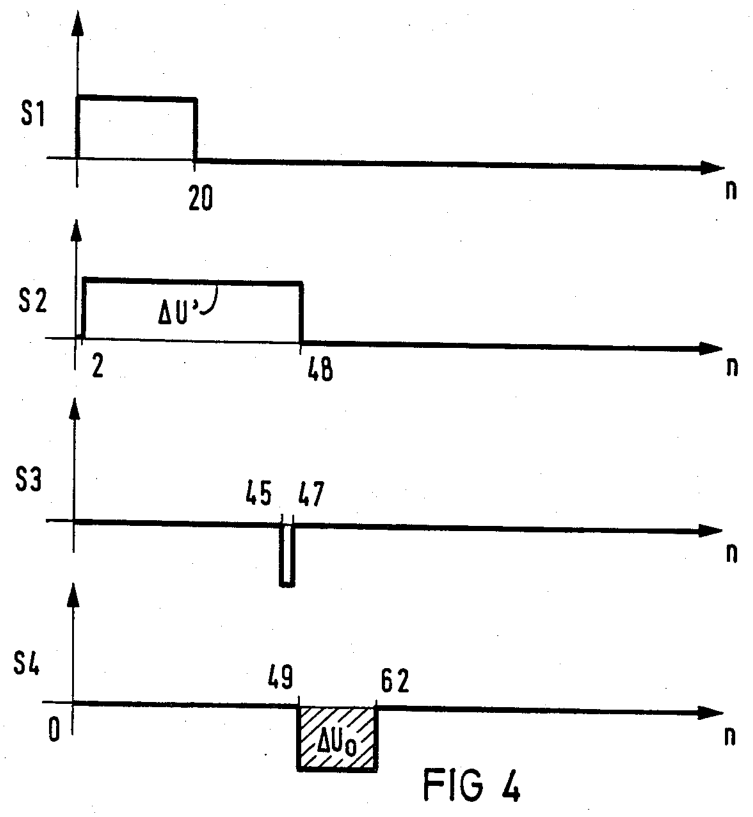
FIG. 4 shows the drive signals of the individual switching elements of the apparatus.

If disturbances in the determination of the power by the operating cycles of the chopper 2 are expected, the oscillator 21 can be tuned to the chopper cycle. By means of the oscillator pulses, the addresses of a memory 22 in which the output pulses, corresponding to each time step are stored for the control system, are successively addressed. FIG. 4 shows an example of the shape of the corresponding control signals as a function of the time steps n.

At the beginning of a cycle, the initially closed switching device 16a, 16b is opened (control signal S1) and immediately thereafter, the supplemental reference value $\Delta U'$ is impressed at the adding point 8 (voltage S2). When the panel has settled and is operating according to the new voltage reference value $U_o+\Delta'$ at a steady-state actual power value, the switching device 16 is closed, while the addition of $\Delta U'$ is preserved. The input voltage of the differentiator 17 thereby jumps to the new actual power value, and a pulse is generated at the differentiating output and the smoothing stage 18, the sign of which is evaluated by the threshold value stage 12. When the voltage of the smoothing stage has approximately grown to its maximum value, the input to memory 13 is briefly enabled by the control signal S3 and the output signal of the threshold value stage 12 present is stored for the duration of a cycle. Subsequently, the impression of the disturbance variable $\Delta U'$ comes to an end, and the updating of the reference value $U_{corr}$ begins. For this purpose, the output of the memory is fed to the integrator 7b through switch 14 for a fixed, predetermined correction time. The output voltage $U_{corr}$ of integrator 7b is thereby changed by the voltage-time area $\Delta U_o$ under the signal S4.

The control of the d-c chopper shown here acts by means of a pulse/pause control in a primary manner on the transmitted current, while the voltage is adjusted in accordance with the load resistance. Other power converters can also be used, of course.

The apparatus therefore makes it possible to readjust the operating point to the optimum operating point, where all shifts of the optimum operating point are taken into consideration automatically.

We claim:

1. In a method for automatically setting the optimum operating point of a d-c voltage source having internal resistance, especially of a solar generator, comprising:

(a) setting a reference value for an electrical state variable which determines the operating point of the d-c voltage source, by means of which the power consumption of a controllable energy converter connected to the d-c voltage source is controlled or regulated, the improvement comprising:

(b) temporarily impressing on the reference value, a supplemental reference value at given time intervals;

(c) determining the differential change of the power output of the d-c voltage source caused by this impression; and (d) after the impression of the supplemental reference value has ended, changing the reference value, with the sign of the reference value change, for a determined positive differential change of the delivered power, equal to the sign of the supplemental reference value, and opposite to the sign of the supplemental reference value if the differential power is found to be negative.

2. The method according to claim 1, wherein the magnitude and the sign of the supplemental reference value are predetermined as equal and fixed for all impressions.

3. The method according to claim 1 or 2, wherein the magnitude of the reference value change is chosen at most equal to the magnitude of the supplemental reference value.

4. The method according to claim 3, wherein the magnitude of the reference value change is predetermined as equal and fixed for all reference value changes.

5. The method according to claim 1, wherein an unchangeable reference value is set below a minimum power output.

6. The method according to claim 1, comprising determining the change of the power output by differential evaluation of the steady states of the d-c voltage source before and during the impression of the supplemental reference value.

7. Apparatus for automatically setting the optimum operating point of a d-c voltage source having internal resistance, especially of a solar generator, comprising (a) a controllable energy transmitter connected to the d-c voltage source;

(b) a control device for the energy transmitter, having an input for accepting a command variable as a reference value for an electrical state variable of the d-c voltage source;

(c) a reference value former for forming a reference value, having its output coupled to said command variable input;

(d) a timing stage for generating a supplemental value output signal;

(e) means to temporarily add said supplemental reference value to said reference value;

(f) means for sensing the output power of said energy transmitter;

(g) an evaluating circuit for determining the derivative with respect to time of the power output, having the output of said means for sensing as an input as it changes due to the addition of said supplemental reference value; and (h) means, providing an input to said reference value former, for readjusting the reference value furnished by said reference value former as a function of the sign of the differential power change determined by said evaluating circuit.

8. Apparatus according to claim 7, wherein said evaluating circuit further includes a limit indicator coupled to said means for readjusting for disconnecting said means for readjusting the reference value if the power output falls below a minimum value.

9. Apparatus according to claim 7 or 8, wherein said evaluating circuit comprises: a memory; a switch coupling said means for sensing to said memory; said timing means adapted to open said switch at the beginning of the addition and close said switch before the end of the addition of said supplemental value; and a differentiator coupled to the output of said memory whereby the steady state power value measured by the measuring element before the switch is opened, will be fed as the stored value to the input of said differentiator, while the switch is open, and the steady state power value measured by the measuring element again with the supplemental value added will be fed after the switch is closed.

10. Apparatus according to claim 9 wherein said reference value former comprises means to form the reference value as the sum of a base reference value and a correction reference value; a setting device for forming the base reference value, and an integrator for forming the correction reference value, and means to couple to said integrator for a short time, after each addition of the supplemental reference value, a predetermined input voltage with a sign corresponding to the sign of the differential power change.

* * * * *